(No Model.)

J. P. STOUT.
COMBINED CHECK OR TOKEN AND MISSIVE.

No. 490,048. Patented Jan. 17, 1893.

Witnesses
Edwin L. Bradford
Wm. A. Rosenbaum

Inventor:
John P. Stout
By D. Stockbridge & Son
Attorneys.

UNITED STATES PATENT OFFICE.

JOHN P. STOUT, OF WASHINGTON, DISTRICT OF COLUMBIA, ASSIGNOR OF ONE-FOURTH TO RICHARD J. KENNEDY, OF SAME PLACE.

COMBINED CHECK OR TOKEN AND MISSIVE.

SPECIFICATION forming part of Letters Patent No. 490,048, dated January 17, 1893.

Application filed March 29, 1892. Serial No. 426,926. (No model.)

*To all whom it may concern:*

Be it known that I, JOHN P. STOUT, a citizen of the United States, residing in the city of Washington, District of Columbia, have invented certain new and useful Improvements in a Combined Check or Token and Missive; and I do hereby declare that the following is a full, clear, and exact description of the invention, such as will enable others skilled in the art to which it appertains to make and use the same.

The ultimate object of the invention is facility in the transaction of business and economy in advertising.

The invention consists in a device or legend which amounts to a check or order upon an account for a sum equal to the rate of postage, in combination with an envelope or card carrying a missive.

By the use of my invention, a merchant or other business man or firm may distribute circulars, dodgers, cards and the like used in business and thereby furnish ready means whereby any person into whose hands the device falls may communicate with him and may order goods and articles without incurring the expense or trouble of providing postage. The business man provides by deposit with the postmaster, or otherwise, for the payment of the postage on such communications as pass through the mails and are delivered to him through a given post-office. A missive, similar in form and size to an ordinary postal card or an envelope is provided with or has imprinted on or otherwise connected with it in the usual position of a postage stamp, a medallion, vignette or other symbol, with or without a legend, amounting to a check or order to debit the account of the addressee in an amount equal to the postage required on said missive. By preference, this check or order or token bears the signature or adopted mark of the addressee. When the check or token is imprinted or otherwise permanently attached to the card or envelope, the name may be the signature of the addressee, or it may be an imprinted fac-simile of his signature, thus serving as an address and a signature to the check, order or token.

Figure 1:
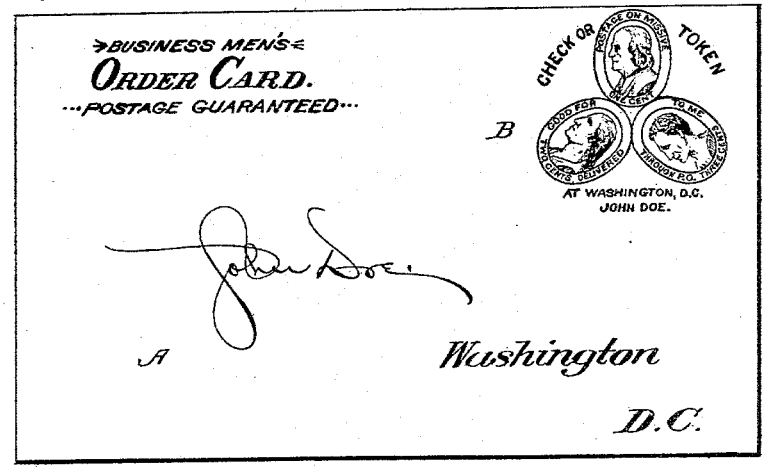
Figure 2:
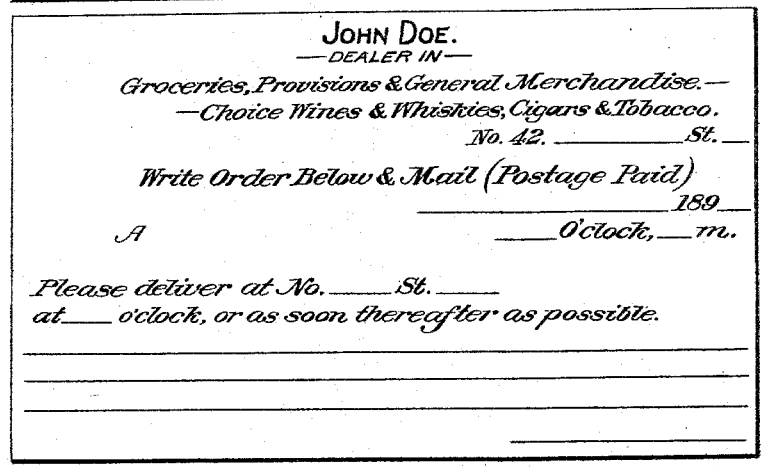
Figure 3:
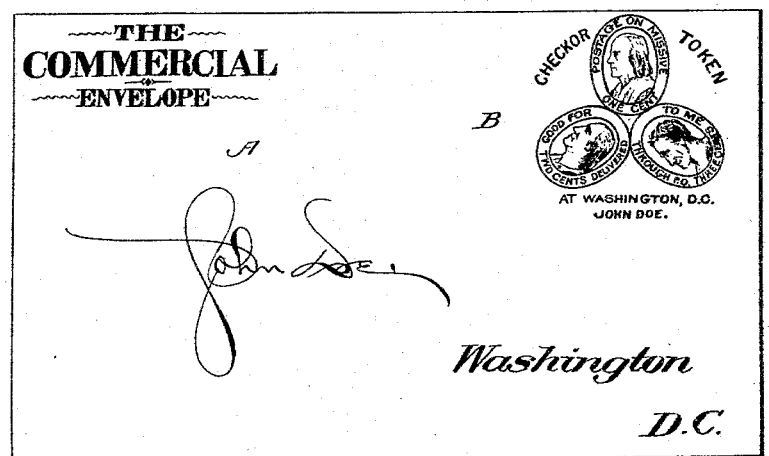

In the accompanying drawings, Figure 1, is the address side of a card similar to a postal card; Fig. 2, is the reverse side of the same, and Fig. 3, is the address side of an envelope.

A indicates the card or envelope, and B, the medallion which is secured or imprinted upon the card or envelope at the upper right hand corner thereof, in the position occupied by the vignette of an ordinary stamped envelope. Ordinarily, I provide the medallion or vignette with three or more branching leaves, in the border of each of which is printed or otherwise indicated a certain amount corresponding to the amount necessary to carry mail matter to its destination. Within the border of the medallion is imprinted a legend, ordering the addressee's account debited in an amount equal to one or more rates of postage, and on the same side or face of the card or envelope is placed the name and address of the addressee.

In the present instance, the medallion or vignette is represented as formed of three branches, or in the shape of a trefoil, as shown, and within the border thereof upon the respective leaves are imprinted the words one, two and three cent, respectively indicating amounts corresponding with that of one or more rates of postage. Outside the border of the medallion or vignette, the legend "Check or Token" is imprinted, and within the margin thereof is imprinted a legend as follows: "Good for postage on missive to me delivered through P. O." and below the same the following "Washington, D. C., John Doe." The card or envelope is imprinted with the same name and address, so that when filled out with the proper order, or in case of an envelope the proper orders are made and inclosed, the card or envelope may be mailed and sent to the addressee, who by pre-arrangement, as by the deposit of a sum of money at the delivery post-office provides for the payment of the postage called for, the amount of which may be indicated at the post-office by canceling or punching a particular trefoil at the said delivery office.

By forming the medallion in the shape of a trefoil and imprinting the leaves with words or characters indicating different amounts, the scope of the check or token is enlarged so that the amount indicated by a single character may be canceled, or that indicated by two or more or all of the characters may be canceled or punched or stamps may be applied, according to the weight of the envelope and its contents. At the upper left-hand corner of the card or envelope is imprinted matter indicating the character and purpose of the card, or envelope and the manner of using it as shown for instance in the card "Business Men's Order Card, Postage Guaranteed" and in the envelope "The Commercial Envelope."

The legend above given, I desire to employ on account of its brevity, but it is obvious that other language than that above noted may be used as a check or that such legend may be omitted and characteristic signs or designs substituted therefor which will serve as a token or order at the post delivery office.

While it is, perhaps, preferable to imprint the medallion or vignette directly upon the card or envelope, in some instances it may be desirable and advantageous to produce the same upon separate sheets after the manner of the ordinary adhesive postage stamps, so that they can be attached to cards or envelopes as desired. Hence, I do not limit myself to the medallion or vignette printed directly upon the card or envelope.

Having now described my invention, what I claim, is—

1. As a new article of manufacture, an addressed missive having connected therewith a vignette, design or legend, constituting a check or order upon an account for an amount equal to one or more rates of postage, substantially as described.

2. As a new article of manufacture, a card provided with an address, with private token formed with a plurality of branching leaves having different amounts indicated thereon and a check legend over the signature of the addressee, substantially as described.

3. As a new article of manufacture, a missive having a fac-simile of the aderessee's signature imprinted thereon, and an imprinted vignette constituting a token or check upon an account, substantially as described.

4. As a new article of manufacture, a check having a legend, design or character of identification constituting an order upon an account at a given post-office for an amount indicated on said check equal to one or more rates of postage, substantially as described.

In testimony whereof I affix my signature in the presence of two witnesses.

JOHN P. STOUT.

Witnesses:
WM. M. STOCKBRIDGE,
EDWIN L. BRADFORD.